Aug. 26, 1969    H. S. HOLLNAGEL ET AL    3,463,274

DISK BRAKE ASSEMBLY AND MOUNTING MEANS THEREFOR

Filed Sept. 26, 1967

Inventors
Harold S. Hollnagel
Harold E. Hollnagel

By Bayard H. Michael
Attorney

United States Patent Office 3,463,274
Patented Aug. 26, 1969

3,463,274
DISK BRAKE ASSEMBLY AND MOUNTING MEANS THEREFOR
Harold S. Hollnagel, Milwaukee, and Harold E. Hollnagel, Mequon, Wis., assignors, by mesne assignments, to Kelsey-Hayes Company, Romulus, Mich., a corporation of Delaware
Filed Sept. 26, 1967, Ser. No. 670,533
Int. Cl. F16d 55/00; F16h 21/44, 21/54
U.S. Cl. 188—73
8 Claims

ABSTRACT OF THE DISCLOSURE

The disk brake is applied by actuating the lever to obtain a camming action between the lever and the fixed bridge and thereby force the floating brake pad carrier towards the fixed brake pad carrier. The design is distinguished by its simplicity.

Background of invention

Most activity in the disk brake field has been directed to automotive use and simpler brakes for less demanding use have been largely simplified automotive brakes rather than being engineered for the simple use. The result has been overbuilt or overly complex brakes.

Summary of invention

Starting with the objective of a simple end use and then engineering to that use, the present invention results in a great simplification over the usual designs. The parts are largely stampings and are reduced to a minimum with consequent cost savings. The essence of the invention is the provision of cooperating cam surfaces acting between a lever and a bridge member to force a floating brake pad carrier towards a fixed pad carrier to apply the brake. In one embodiment the lever and the bridge member have complementary surfaces having a V cross section so actuation of the lever forces the lever in the brake setting direction. The other form allows lever actuation in a different plane and the lever is provided with a pivot pin captured between the bridge and the floating pad carrier. The lever additionally carries a pin which acts as a spacer when the brake is released and is forced against the pad carrier when the lever is actuated. The principal difference between the two embodiments lies in the direction in which the lever projects from the brake and the resulting modification required.

Description of preferred embodiments

Figure 1:
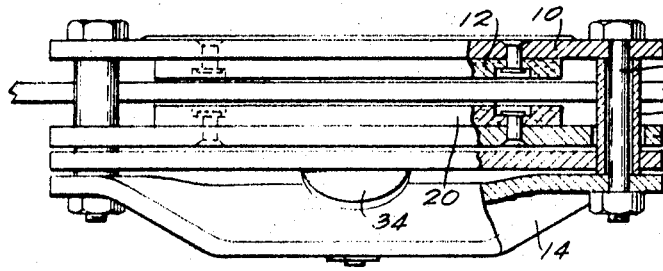
FIG. 1 is a top plan view partly in section of the brake and with a fragmentary disk positioned between the brake pads.
Figure 6:
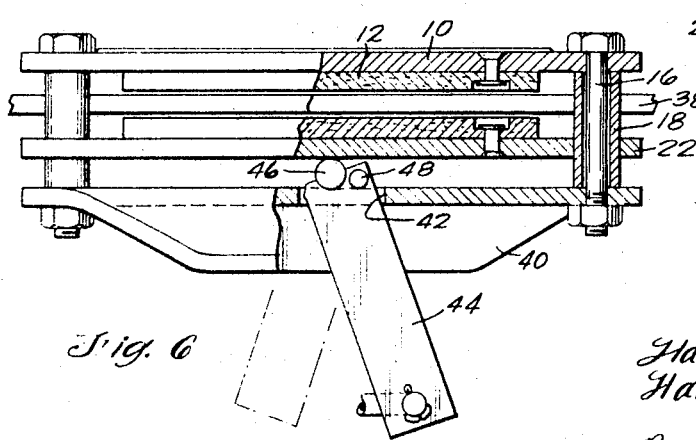
FIG. 6 shows another form of the actuating lever.

The fixed brake pad carrier 10 has the brake pad 12 riveted thereto and is connected to the bridge member 14 by means of bolts 16 each of which supports a spacer sleeve 18 the opposite ends of which are maintained in fixed abutting relation with the said rod carrier 10 and said bridge member 14 by said bolt members 16, as clearly shown in FIGS. 1 and 6. The other brake pad 20 is riveted on pad carrier 22 which is slidable on spacer 18. The yoke 24 may also be slidably mounted on spacer 18 to support the brake unit in its position of use.

Figure 3:
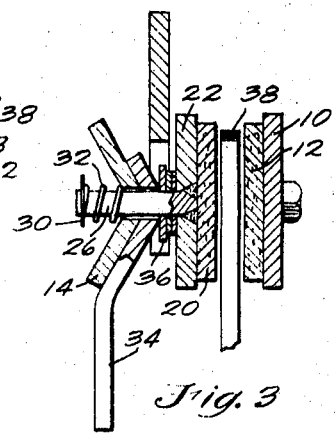
FIG. 3 is a section generally along line 3—3 in FIG. 2.

Pivot pin 26 is fixed on the floating pad carrier 22 and projects through the cooperating hole 28 in bridge 14 with a C-ring or washer 30 on the outer end to permit spring 32 to be compressed between the washer and the bridge to thereby bias the floating carrier 22 to the left as viewed in FIG. 3. As may be seen clearly in FIGS. 3, 4, and 5 in particular, the bridge is formed between its ends to present a generally V-shaped contour in cross section. The end of lever 34 pivoted on pin 26 is similarly formed so when the brake is released the bridge and lever nest as seen in FIG. 3.

Figure 2:
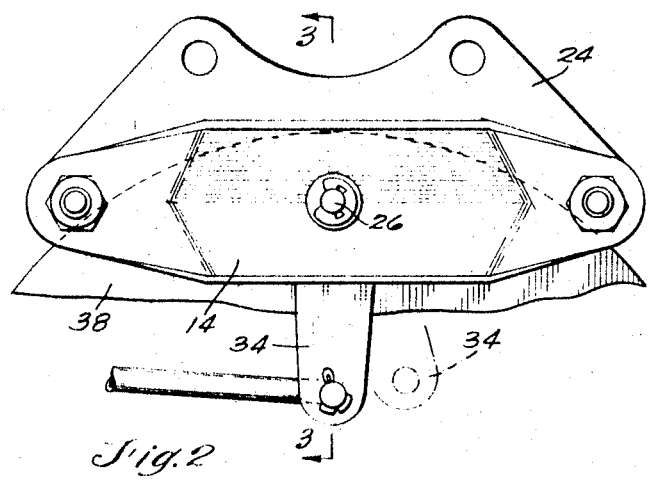
FIG. 2 is a front elevation of the brake unit shown in FIG. 1.
Figure 4:
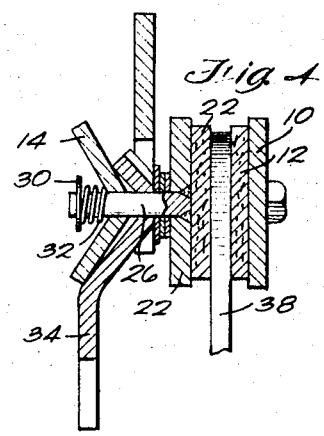
FIG. 4 is comparable to FIG. 3 but shows the lever in the actuated position so as to cam the floating brake pad carrier towards the fixed brake pad carrier and exert the braking force on the disk.
Figure 5:
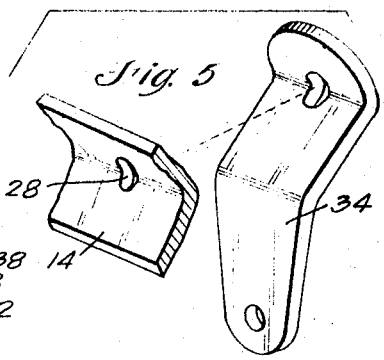
FIG. 5 is a fragemntry perspective showing the complementary formation of the lever and bridge member.

When the lever is moved from the solid line position shown in FIG. 2 to the dotted line position the complementary surfaces of the bridge and lever are forced out of the nesting position as may be seen clearly in FIG. 4. This, therefore forces the lever to the right since the bridge is fixed. As the lever moves to the right it bears against the washers 36 which serve as an inexpensive thrust bearing. As the lever forces the washers and, hence, the floating carrier 22 to the right the pad 20 is forced against the disk 38 which normally rotates between pad 20 and pad 12. Therefore, the brakes are applied and the greater the force applied to the lever the greater the braking force obtained.

In the embodiment just described the lever essentially lies in and is actuated in a plane parallel to the disk. In some cases it may be more convenient to actuate the brake with the lever arm brought out at right angles to the plane of the disk. This can be accomplished with the construction shown in FIG. 6 in which the similar parts are similarly numbered but it will be noted the bridge 40 is now provided with a bolt 42 through which the lever 44 may project. The inner end of the lever is provided with a pin 46 which, in the view shown, acts as a spacer when the brakes are not applied. The lever is pivoted about the smaller pin 48 also carried by the inner end of lever 44. It will be appreciated that both pins 46, 48 extend at right angles above and below the lever so as to balance the forces when the brake is applied. When the brake is applied by moving the outboard end of lever 44 to the dotted line position shown the lever will pivot around pin 48 and this will cause pin 46 to move in an arc around the pivot pin 48 and, in turn, force the floating carrier 20 towards the disk and set the brake. When the lever is released the floating carrier is free to move away from the disk to the extent necessary to release the brake and even in the most perfect disk there will be some wobble and this will act to insure adequate clearance between the pads and the disk.

We claim:
1. A disk brake assembly comprising:
   a fixed brake pad carrier,
   a bridge member,
   spacer means interconnecting and supporting the carrier and the bridge member and including a pair of bolt members, each carrying spaced abutment means engaged by the pad carrier and by the bridge member respectively,
   a floating brake pad carrier slidably mounted on the spaced means between the fixed carrier and the bridge member,
   a lever having one end positioned between the bridge member and the floating carrier for pivotal movement,
   said one end of the lever including means occupying a minimum space between the floating carrier and the bridge in one position of the lever and a maximum space between the floating carrier and the bridge in a second position with the lever being pivoted between the positions to operate the brake by forcing the floating pad carrier towards the fixed pad carrier upon pivotal movement from said one position to said second position.

2. A disk brake assembly comprising:
a fixed brake pad carrier,
a bridge member,
spacer means interconnecting and supporting the carrier and the bridge member and including a pair of bolt members, each carrying spaced abutment means engaged by the pad carrier and by the bridge member respectively,
a floating brake pad carrier slidably mounted on the spacer means between the fixed carrier and the bridge member,
a lever having one end positioned between the bridge member and the floating carrier for pivotal movement,
said one end of the lever including wedging means operative as the lever is moved between first and second positions to exert a wedging action between the bridge member and the floating carrier to force the floating carrier towards the fixed carrier and apply the brake.

3. A disk brake according to claim 2 in which the lever pivots about a pivot pin and the wedging means is eccentric to the pivot pin, said lever acting as a spacer in said first position to limit the separation of the brake pad carriers.

4. A disk brake according to claim 3 in which the bridge member and the lever are provided with complementary V-shaped surfaces which nest in said first position and are forced apart as the lever is rotated to the second position, said pivot pin being carried by the bridge member and the floating carrier.

5. A disk brake according to claim 4 in which the pivot pin is fixed to the floating carrier and passes through the bridge member,
a flange carried by the pin on the end projecting through the bridge member,
a spring compressed between the bridge member and the flange to bias the floating carrier away from the fixed carrier.

6. A disk brake according to claim 3 in which the pivot pin is carried by the lever and the lever projects through the bridge member.

7. A disk brake according to claim 6 including a second pin carried by the lever, both pins being captured between the bridge member and the floating carrier.

8. A disk brake according to claim 7 in which the first pin is smaller in diameter than the second pin and the second pin acts as a spacer when the lever is in said first position.

References Cited

UNITED STATES PATENTS

| | | | |
|---|---|---|---|
| 2,966,964 | 1/1961 | Brueder | 188—73 |
| 3,211,261 | 10/1965 | Chouings | 188—73 |
| 3,269,490 | 8/1966 | Swift | 188—73 |
| 3,292,739 | 12/1966 | Ulbing | 188—73 |
| 3,358,793 | 12/1967 | Hollnagel et al. | 188—73 |

FOREIGN PATENTS

| | | |
|---|---|---|
| 1,373,940 | 8/1964 | France. |
| 972,616 | 10/1964 | Great Britain. |

GEORGE E. A. HALVOSA, Primary Examiner

U.S. Cl. X.R.

74—107